(12) United States Patent
Long, Sr.

(10) Patent No.: US 7,533,803 B2
(45) Date of Patent: May 19, 2009

(54) CONSUMER DIRECTED CHECKING ACCOUNT COVERAGE SYSTEM

(75) Inventor: Kenneth W. Long, Sr., Monroe, NC (US)

(73) Assignee: Critical Point Group, Charlotte, NC (US)

(*) Notice: Subject to any disclaimer, the term of this patent is extended or adjusted under 35 U.S.C. 154(b) by 0 days.

(21) Appl. No.: 11/624,497

(22) Filed: Jan. 18, 2007

(65) Prior Publication Data

US 2007/0198303 A1 Aug. 23, 2007

Related U.S. Application Data

(63) Continuation of application No. 11/347,728, filed on Feb. 3, 2006, now Pat. No. 7,182,253.

(60) Provisional application No. 60/649,826, filed on Feb. 3, 2005.

(51) Int. Cl.
G06F 19/00 (2006.01)
G06F 17/00 (2006.01)
G06Q 20/00 (2006.01)
G06Q 40/00 (2006.01)

(52) U.S. Cl. .................. 235/379; 235/375; 705/17; 705/39

(58) Field of Classification Search ........... 235/379, 235/380; 705/4, 35, 40, 43, 45
See application file for complete search history.

(56) References Cited

U.S. PATENT DOCUMENTS

| | | | |
|---|---|---|---|
| 6,119,093 A | 9/2000 | Walker et al. | |
| 6,315,196 B1 * | 11/2001 | Bachman | 235/380 |
| 6,783,065 B2 | 8/2004 | Spitz et al. | |
| 2003/0130919 A1 | 7/2003 | Templeton et al. | |
| 2004/0243506 A1 | 12/2004 | Das | |
| 2004/0254878 A1 * | 12/2004 | Fitzsimmons et al. | 705/38 |
| 2005/0027650 A1 | 2/2005 | Walker et al. | |
| 2005/0108064 A1 * | 5/2005 | Castleman et al. | 705/4 |
| 2006/0116903 A1 * | 6/2006 | Becerra | 705/2 |
| 2007/0138259 A1 | 6/2007 | Dragt et al. | |
| 2007/0214076 A1 | 9/2007 | Robida et al. | |

* cited by examiner

*Primary Examiner*—Steven S Paik
*Assistant Examiner*—April A Taylor
(74) *Attorney, Agent, or Firm*—Alston & Bird LLP

(57) ABSTRACT

A system and method that includes the use of a bank checking account that can be connected to insurance coverage. In particular, a banking consumer can purchase insurance coverage for unexpected events that may affect the historical deposits and withdrawals relating to the checking accounts. Additionally, insurance coverage other than that of the checking account itself can be included, such as life insurance, so long as the account remains active. Accordingly, the present invention can integrate the negative insurance sell into a positive banking experience.

20 Claims, 1 Drawing Sheet

CONSUMER DIRECTED CHECKING ACCOUNT COVERAGE SYSTEM

CROSS REFERENCE TO RELATED APPLICATION

This application is a continuation of U.S. application Ser. No. 11/347,728 filed Feb. 3, 2006 now U.S. Pat. No. 7,182,253, which claims priority from U.S. Provisional Application No. 60/649,826, filed on Feb. 3, 2005, both of which are hereby incorporated herein in their entirety by reference.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates generally to a checking account system.

As information technology continues to expand and flourish, and as new legislation continues to be enacted to address this growing technology, the banking and insurance industries must also diversify their methods and products to sustain and/or expand their customer bases. Accordingly, the development of new products and systems that will provide these results has is of high priority to modern banking and insurance.

Banks think and sell positively as far as checking accounts and related services go. Banks are not trained to sell negatively, as the insurance industry does. Unfortunately, the insurance industry has to sell protection against really bad things happening to customers and their loved ones. Furthermore, to get the benefit, those insured usually have to die. Accordingly, banks are better positioned to provide new products and methods to customers.

Probably the most significant banking product to most people is the checking account. Also known as banking's flagship product, the checking account is to most people the primary repository of net earnings from month to month. As such, checks and debits drawn against the account represent the life style that account holder can afford, or at least the lifestyle they are trying to afford. As bankers focused on processing transactions and selling new services to attach to an already cluttered checking account, they often forget that these checks represent real life events, both routine and special for the account holder. These events thus often carry with them tremendous positive and negative emotions—checks written to pay for a child's college tuition, a mother's funeral, a young couple's first down payment on a new house, alimony, court settlements, groceries, tithes to churches, etc. Millions upon millions of real life events pass through the bank's reader-sorters in tangible form every night. Those little 2¾" by 6" pieces of paper and automatic payments, therefore, truly do embody the hopes, dreams and fears of our account holders. For them, the monthly bank statement long ago became the de facto report card on whether or not they are winning or losing at the game of life. Therein is the untapped potential of the checking account.

Banks have much invested in making the checking account cost effective, easy to use, and necessary. Over the years, the checking account has evolved from passbooks, to checks, to personalized checks, paper drafts, paperless payments (ACH), automatic payroll deposit, interest on checking (this one really broke bank's hearts), overdraft credit lines, debit cards, online banking/bill payment, free checking, toasters, from simple to complex service charge routines, automatic transfers to savings, etc. If a bank product team can think of it, a bank somewhere has done it. The result has been the increasing complexity and commoditization of checking accounts. Outside the industry, the commoditization continues with the granting of checking account powers to credit unions, savings banks, and brokerage houses. Now, most any group can offer checking accounts, much to the chagrin of bankers. This kind of stress on checking account margins causes banks to continually seek out new ways to reduce processing costs. Most recently, this has manifested itself in the Check 21 law ("Check 21") and float reduction initiative.

The Check 21 law was a watershed event. As watchdog groups analyze the impact of this sea of change in check clearing on individual consumers, demands are being placed on banks to provide an accounting of how much money they are making or saving. The monthly account earnings credit on personal checking accounts is suddenly on the table. Bankers are used to communicating to those with commercial accounts about receiving services and benefits as a function of excess collected balances. Banks, however, have avoided this communication with personal account-holders. Accordingly, the ultimate fallout from Check 21 likely will be a revolution in how bankers and consumers look at personal checking accounts. It is likely that banks Will eventually have to provide more benefit for collected funds.

With the advent of Check 21, if something disrupts the lives of banking customers and banks fail to deposit on time the required funds to support the life style commitments of these customers, the automation, convenience and speed of processing suddenly will come back to hurt banks. The stage is now set for each party's view of the other to permanently change for the worse. Personal checking account now takes center stage in a drama that will quite possibly end the customer's relationship with the bank. The deposit challenged account becomes something like a fast moving freight train: very hard to stop before the damage is done! As the dominos begin to fall, the account and the account holder's life is damaged.

In a perfect world the bank can say, "That's what overdraft checking and cash advances off credit cards are for. You shouldn't spend more than you have in the bank." However, the bank has enticed and then addicted the account holder to easy credit, such that many consumers live at or near the top of their "emergency use" credit facilities. Adding additional consumer debt usually only exacerbates the downward spiral anyway; particularly if the account holder's normal deposit flow is interrupted for an extended period of time. Unforeseen life events such as job loss, account breakup due to divorce or extended separation, short-term unemployment due to health issues, or the death of a breadwinner in a joint account are beyond the reach and intended use of emergency credit. Granted, account holders to varying degrees have coverage for some of the above. The problem is the time involved in claiming those benefits. When the money does come, it's usually too late and too small to avoid damage to the account holder's relationship with the bank, other creditors and their credit history.

As the dominos continue to fall, data is now being accumulated that causes the bank to wonder if it even wants the account. The consumer begins to associate the bank with NSF notices, OD notices, and late notices. Messages are left on answering machines that further anger or embarrass the customer. Tellers give those funny looks and are not as friendly. Everyone seems to know the account holder is in trouble. Other non-bank creditors write or call and say "The bank returned your check or the bank dishonored your draft." These temporary circumstances are now working against the bank keeping the account. This is important because in today's model, the broker and the carrier assume all the risk and pay all the campaign costs. In fact, insurance departments brag that they make the bank money without spending money. Everything is now working against the bank keeping the account. Banks have much invested in making the checking account cost effective, easy to use, and central in the account holder's mind for making the consumer side of life happen. The bank's investment is the use of its brand and customer mailing lists. Insurance department promotions through these third party brokers are not considered core to the banks mission and are often viewed as red headed stepchildren. The bank's attitude is, "As long as we don't have to do any work, its low risk, and if we make money, fine, no harm done, and if no one buys the offer, the broker and carrier lose, not us." This attitude minimizes potential account holder profit contribution because it marginalizes the value of a valuable "captive" customer touch point. Customer retention and satisfaction are put at risk by offering inferior products at inflated prices.

Over the years, the checking account has evolved from passbooks, to checks, to personalized checks, paper drafts, paperless payments (ACH), automatic payroll deposit, interest on checking (this one really broke bank's hearts), overdraft credit lines, debit cards, online banking/bill payment, free checking, toasters, from simple to complex service charge routines, automatic transfers to savings, etc. In short, if a bank product team can think of it; it has been done by some bank somewhere. Within the industry, the result has been the rampant addition of complexity to checking account offerings and their commoditization. Outside the industry, the commoditization continues with the granting of checking account powers to credit unions, savings banks, and brokerage houses. Now, most any group can offer checking accounts, much to the chagrin of bankers. This kind of stress on checking account margins causes banks to continually seek out new ways to reduce processing costs. Most recently, this has manifested itself in the Check 21 law and float reduction initiative. Accordingly, it might not be long before banks have to give direct and measurable benefit for collected funds. Banks thus need to take the initiative.

Insurance companies must also take initiative. The entire process of insurance is awkward, fraught with time delays, errors, multiple handoffs, and unnecessary expense. This process has become the biggest deterrent to offering anything but the most basic low yield products. The result is low response and even lower conversion for high campaign execution expense. The industry, as a whole, is continuing to do things the same way they were 30 years ago. Entrenched processes and associated inefficiencies rule the day. Mail boxes are cluttered with simplistic "dumbed-down" look a like offers with little appeal and usually perceived by the consumer as having suspect value. Often, list age and quality issues lead to multiple identical offers going to the same customer. Many bank brands, have as a result, been cheapened by their association with "junk mail" promotions of low value offerings and bad customer service by the third parties.

Products designed for complex integration and execution go counter to this attitude. Traditionally, every effort is made to "make it simple and easy" for the bank's insurance department to get name and address lists of certain demographic profiles or new accounts, etc. from the IT department. Anything with any degree of complexity is either going to take a long time to get through the bureaucracy or not get done at all. Once again, since insurance sales are not viewed as core to the account relationship and the banks desire to grow that relationship, the less help from the bank you need the better. Integrating life insurance benefits into the core account value proposition is on no ones radar screen. Certainly not in the bank and probably not on the mind of the broker since integrated benefit execution is so complicated.

Accordingly, there exists a need for a new and improved product and method that can enhance the services provided by both banks and insurance companies.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major aspects, and briefly stated, the present invention includes a system and product that includes the use of a bank checking account that can be connected to insurance coverage. In particular, a banking consumer can purchase insurance coverage for unexpected events that may affect the historical deposits and withdrawals relating to the checking accounts. Additionally, insurance coverage other than that of the checking account itself can be included, such as life insurance, so long as the account remains active. Accordingly, the present invention can integrate the negative insurance sell into a positive banking experience.

An account holder's propensity to buy this type of protection is never higher than at that critical point each month where he or she reviews and ponders the account history and future account needs. The present invention allows account holders to purchase through the checking account, coverage that provides for the continuation of the account's historic deposit levels, for a time they deem appropriate, in the event of unforeseen life emergencies. Additionally, the present system can be completely automated and accessible through the Internet, such as through a centralized database.

A feature of the present invention is the use of bank checking accounts in combination with insurance policies that can provide coverage for sustaining historic deposit levels. By allowing the account holder to purchase protection for their deposit flow (within the framework of the core checking account) in the event of a negative life event, the present invention provides the account holder a powerful incentive to consolidate deposit accounts in other institutions into the insured account by offering reduced coverage costs for increased deposit levels. This further allows them to buy time with "new cash" they do not have to pay back. The positive outcome is that these account holders will get well, get hired, develop new relationships and their hearts will heal. Their lives will go on. All they need is a little time to get their lives back together without their financial world collapsing around them bringing long term negative consequences.

From the bank's perspective, banks want to move customers to internet banking and electronic bill pay. Further, anything that enhances customer loyalty, as well as growing deposits, is desirable to banks. Establishing and retaining new accounts at a low cost is also positive. Unique, high value, easily sold, and quickly understood products are desirable. Getting a wealth management representative to a household first and ahead of a wealth transfer is desirable. Products that bring new prospects and existing account holders into the branches' lobby for financial counseling at a time when a deposit relationship may be at risk is desirable. Reducing "unnoticed" deposit evaporation is desirable. Having your bank's checking account and/or on line banking services viewed as vastly superior to anything else in town is positive. Automatically converting basic checking accounts into elementary, but potentially high value asset accounts that provide the bank with an enhanced view of the account holders growing or diminishing appetite for additional financial products is also a good thing. Minimizing branch traffic that does not generate income, increase deposits, or create a sales opportunity is good. Turning obligatory customer service functions into revenue opportunities is good. Giving account holders high value reasons to consolidate other accounts from other banks into your bank is good. Banks want to be viewed by the consumer as first among the many financial options out there today. Banks want to be the aggregator of all the consumers' money.

From the customer's point of view, customers do not like to buy life insurance, most of the time it has to be sold to them. One can go a long time without it. One only needs it when something bad happens. Customers buy checking accounts because it's hard to get through the day without one. Many customers have more than one and are looking for reasons to consolidate. With all the banks' efforts to differentiate checking accounts, consumers still see them as a commodity and look for free deals and are willing to switch banks for a better deal, often with no warning. Customers are concerned about the death of a bread winner, about losing their job from layoff or termination, about the potential for divorce, and about any form of disability that cuts off income. Customers appreciate privacy, ease of purchase, simple honest product presentation, flexibility and control over features and benefits, rewards and benefits for being loyal and want maximum return for the deposits they keep with the bank, simple integrated statements with color, graphs, etc., bank branches and personal interaction, especially when they think they've got something important to talk about. The kinds of life events the present invention can provide benefits for can always bring the account holder into the branches. Those customers who use on-line banking and bill pay are loyal and usually a little more affluent than the average checking account customer. They also tend to have more than one relationship with the bank. Customers do not like the Check 21 law and the fees associated with courtesy overdraft protection.

Other features and advantages of the present invention will be apparent to those skilled in the art from a careful reading of the Detailed Disclosure of the Preferred Embodiments presented below and accompanied by the drawings.

DETAILED DESCRIPTION OF THE PREFERRED EMBODIMENTS

Figure 1:
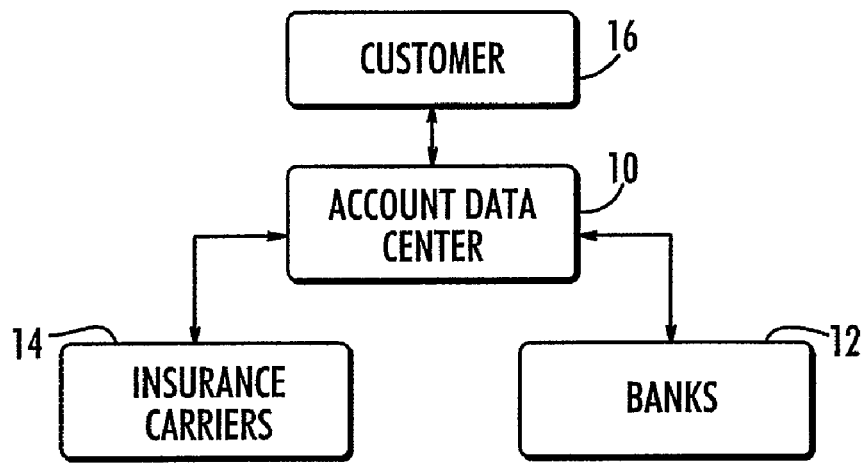
FIG. 1 illustrates a schematic view of a checking account system according to a first embodiment of the present invention.
Figure 2:
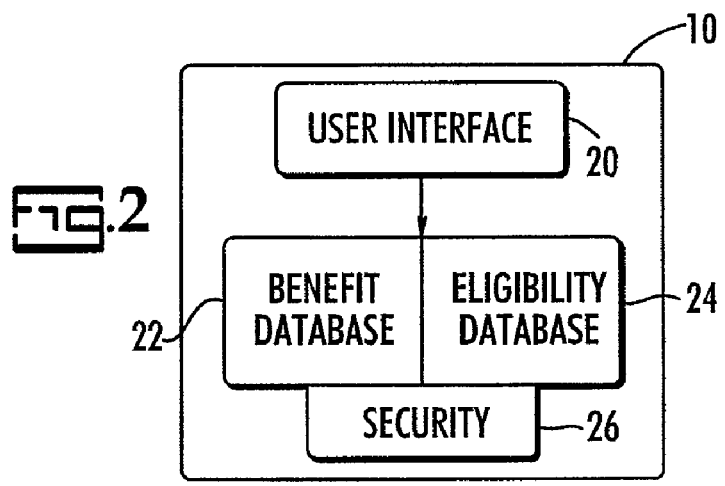
FIG. 2 illustrates a schematic view of an account data center that can be part of the checking account system according to a first embodiment of the present invention.
Figure 3:
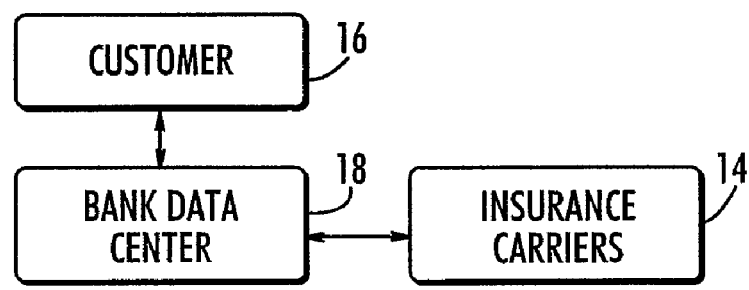
FIG. 3 illustrates a schematic view of a checking account system according to an alternative embodiment of the present invention.

As illustrated in FIGS. 1-3, the present invention includes a checking account system. All the automation and never ending integration of new features into checking accounts has effectively created an account that is a life mirror that moves in parallel to the customer's own complex time starved daily lives. The stresses of being "on the edge in our lives" are reflected in checking accounts. If something goes bump in the life of the customer and he or she fails to deposit on time the required funds to support life style commitments, customers quickly learn that all that friendly automation, convenience and speed of processing suddenly turns on them. The checking account now takes center stage in a drama that will quite possibly end the customer's relationship with the bank. The deposit challenged account becomes something like a fast moving freight train; very hard to stop before the damage is done! As the dominos begin to fall, not only is the account damaged but all the external relationships we pay to maintain our life style.

Accordingly, the present invention provides a system whereby a customer 16 can purchase insurance coverage for their deposit flow. As illustrated, the customer 16 can be provided access to an account data center 10, which can include benefits and eligibility information in addition to the standard account information. Through a user interface 20, the customer 16 can access a benefits database 22 to obtain a customized coverage plan for their particular checking account. If eligible, the customer 16 can then be provided with a policy that is entered into and managed at the eligibility database 24. Both banks 12 and insurance carriers 14 can have access to the account data center 10 for purposes of generally managing the policies and accounts, as well as to continue to provide updated information about the policies and accounts. The accounts can include a security feature 26, whereby customers 16 enter their bank account code or password to access their insured accounts.

As discussed, a feature of the present invention is to provide a checking account that can be insured with a policy that provides coverage for deposit history. By allowing the account holder to assume responsibility for the unforeseen by purchasing protection for their deposit flow (from inside the core checking account) in the event of a negative life event, customers can buy time with "new cash" they do not have to pay back. The good news is that these account holders will get well, get hired, get focused, develop new relationships, and their hearts will heal. Their lives will go on. All they need is a little time to get their lives back together without their financial world collapsing around them bringing long term negative consequences.

The present invention further provides for the conscious design of insurance offerings that require sophisticated business rules and client integration up front, and complex execution and fulfillment on the backend. The present invention can be completely automated and can take full advantage of digital print, email, and website presentation. Traditional low value AD&D/Life mass market mail offerings can be avoided. Furthermore, the checking accounts can be managed in a number of ways by a number of industries. A third party manager not associated with either banks 12 or insurance carriers 14 can provide the database. Alternatively, the banks 12 themselves can mange the accounts, as shown in FIG. 3. Because of potential for impact on deposit and revenue growth, the account information may also be handled by regular product development groups reporting to the CMO as opposed to the insurance department.

The present invention can include many alternative embodiments considering the complexities of both the banking and insurance industries. Accordingly, the following examples are provided for descriptive purposes only. First, the customer 16 can be provided with an offer or promotion. For example, the promotion can explain that loyalty in on-line banking community can be rewarded with personalized, high value, easy to acquire, easy to modify, and reasonably priced account protection for some of life's unforeseen events. The potential for income interruption resulting in a reduced quality of life can be brought on by at least four, if not more, difficult and stressing real life events is common to all family units today. These can be:

Death of one of the income producing joint account holders

Temporary or long term disability of a joint account holder

Divorce

Salary Interruption

While employers may provide many of these benefits to help protect the family against some of these events, by and large, employees today are nervous about their employment status. They also often wonder about the real dollar value of various components of their company benefit package as well as all the rules that determine how and when they become eligible.

Granted, the account holders can call an insurance agent and buy all sorts of protection. The reality is that most people only care to have the minimal insurance coverage possible. Therefore, many account holders drift for years with no real protection from these four big potential life disrupting events, as well as other events. Furthermore, two of the big four, divorce and salary interruption, are not provided for at all. Also, the account holder's required coverage may need to vary over time and their ability to pay for premiums may vary. Sometimes needs change almost on a month-to-month basis.

Studies have shown that one of the main reasons consumers 16 do not call an insurance agent is that they are afraid they will be sold too much of the wrong kind of coverage and wind up with a monthly premium they cannot afford, which leads to cancellations. The present invention can provide a mechanism to achieve reasonable cost yet high value (in the mind of the account holder) benefits that match the account holder's needs, automatically, at any point in time for probable life emergencies. These benefits are not intended to totally replace the requirement for the account holder to do proper financial planning, but rather to be considered a part of their total protection.

These benefit packages can be monitored through an automated transaction account, because the core transaction (checking) is the only repository of all the account data necessary to process and maintain sophisticated variable benefit products of the present invention. The present invention can be an add-on or supplement to a bank checking account, preferably an on-line banking enabled account with automatic payroll deposit and electronic bill pay. Managing the account holders benefit profile and automatic fulfillment of marketing and account materials can accomplished through a secure connection to the benefit database that can be housed in the account datacenter 10, or alternatively behind the banks' 12 firewall. At all times, the account holder, when on-line, can seamlessly branch to a series of Web screens on servers to read and print marketing materials, play "what if" games with benefit calculators and request a personalized printed offer be mailed to them if desired (the system will recommend minimum/maximum benefit amounts derived from an analysis of certain historical account data), and make add/change/delete benefit decisions. All of this will be allowed under the account holders existing bank sign in and password.

Once the account holder has chosen a benefit and all approvals are done on line, the present system then can add the account holder to the eligibility file 24 it manages. It is envisioned that this dynamic eligibility database 24 will only be housed by a single source provider. The appropriate employees of the single source providers, the insurance carriers 14 and client banks 12 will have real time remote access. Further, the Internet can allow all parties to work from the same file in a secure manner.

The following includes a sample account holder criteria:

OLB customer for one year, currently active

Joint account

Automatic payroll deposit

Average Balance

No NSF or OD history in the last year eBill pay desirable

Credit score

Other, i.e.; Check Card, Credit Card, HELOC, Overdraft Protection

The combination of the above is can be a function of the requirements of the underwriters' needs and the banks' analytics used to rate account holders for qualification in any program.

There can be two eligibility files 24 managed by a single source provider. One for the "thank you" product and another for the more complicated variable benefit product buyers. The former requires daily feeds of new "accepts" and account maintenance such as dropping an account signatory or account closure. The latter will require interaction with the account statement and service charge cycle, and data warehouse account record.

The local branch of banks 12 can be the point of notification for claims. Any of the life events we're discussing here now bring the account holder into the branch. For the most part, these visits are viewed as an expense and little effort is made to cause something positive to happen. In the present invention, these events can be used as "trip wires," the first harbinger that the account is at risk and secondary wealth transfer events are probable. The present product and approach can make it virtually impossible for accounts to close and new wealth to wind up in another financial institution without the branch sales force having a chance to secure those deposits and services.

Death certificates and divorce papers can be presented everyday at bank branches to settle accounts, divide money up, drill safe deposit boxes, etc. Copies are often made for the bank's records. This is branch work that cannot be avoided, but the present invention can convert these chores into revenue generating opportunities. For example, the death certificate, divorce papers, termination papers, and medical temporary disability papers can be faxed to the single source provider by the branch. This will trigger two major activities. One will branch into an expedited claims process which will generate a series of triggers for automated new account setup, deposit transfer, automated calling officer appointments, and various notifications. Temporary check and debit card production along with marketing materials can also be mailed by the single source provider to the account holder.

The following describes a sample promotion: An email is sent to each qualifying on-line banking (OLB) account holder advising them that they have qualified for a free gift of $5,000 in life insurance for each account holder just because the bank wants to reward such good customers. As long as they continue as good OLB customers, the insurance will remain in force. The email will also be crafted to point to a bank private labeled Web site that will offer the expanded benefit coverage mentioned earlier and how to buy it.

If they accept the free $5,000 benefit, they must check the Accept Box which is then routed to the single source provider. The single source can then extract the policy holders' individual account names, add them to the eligibility database, print the certificates, and mail them to the account holders. This benefit remains in force as long as both account holders are owners of the original account and they are active OLB users.

Those skilled in the art of banking and insurance systems will recognize that many substitutions and modifications can be made in the foregoing preferred embodiment with departing from the spirit and scope of the present invention.

What is claimed is:

1. A method comprising:
providing an account data center;
providing an insurance benefit database associated with the account data center;
providing an eligibility database;
providing an account holder access to the account data center, where the account holder has an associated financial account;
accessing information in the eligibility database associated with at least one of (a) the account holder and/or (b) the information relating to the financial account;
determining a type and/or level of insurance to offer to the account holder;
providing an insurance policy offer to the account holder from the insurance benefit database; and
determining a rating for the financial account and storing the rating in an eligibility database,
wherein determining a rating for the financial account is based at least on information related to the financial account, where one or more of the following pieces of information are used in determining the rating:
financial account includes on-line banking;
financial account is a joint account;
financial account includes automatic payroll depositing;
average balance associated with the financial account;
number of times there was insufficient funds or over drafts in a given time period;
financial account includes check card feature;
financial account includes credit card feature; and
financial account includes overdraft protection.

2. A method according to claim 1, wherein a coverage associated with the insurance policy offer is contingent upon the account holder not closing the financial account.

3. A method according to claim 1, wherein a coverage associated with the insurance policy offer provides for the continuation of historic monetary levels.

4. A method according to claim 1, wherein the account datacenter is accessed through the Internet.

5. A method according to claim 1, wherein the financial account is a loan, and said providing an insurance policy offer to the account holder from the insurance benefit database comprises providing a coverage to cover payments due on the financial account.

6. A method comprising:
providing an account data center;
providing an insurance benefit database associated with the account data center;
providing an eligibility database;
providing an account holder access to the account data center, where the account holder has an associated financial account;
accessing information in the eligibility database associated with at least one of (a) the account holder and/or (b) the information relating to the financial account;
determining a type and/or level of insurance to offer to the account holder; and
providing an insurance policy offer to the account holder from the insurance benefit database,
wherein the account datacenter is accessed through an automated teller machine and said providing an insurance policy offer to the account holder provides the insurance policy offer via the automated teller machine.

7. A method according to claim 6, wherein a coverage associated with the insurance policy offer is contingent upon the account holder not closing the financial account.

8. A method according to claim 6, wherein a coverage associated with the insurance policy offer provides for the continuation of historic monetary levels.

9. A method according to claim 6, wherein the account datacenter is accessed through the Internet.

10. A method according to claim 6, wherein the financial account is a loan, and said providing an insurance policy offer to the account holder from the insurance benefit database comprises providing a coverage to cover payments due on the financial account.

11. A method, comprising:
providing an account data center;
providing an insurance benefit database associated with the account data center;
providing an eligibility database;
providing an account holder access to the account data center, where the account holder has an associated financial account;
accessing information in the eligibility database associated with at least one of (a) the account holder and/or (b) the information relating to the financial account;
determining a type and/or level of insurance to offer to the account holder;
providing an insurance policy offer to the account holder from the insurance benefit database; and
determining a rating for the financial account associated with the account holder based on at least one of (a) the account holder and/or (b) the information relating to the financial account,
wherein determining a rating for the financial account is based at least on information related to a credit score of the account holder associated with the financial account.

12. A method according to claim 11, wherein the financial account is a bank account, and wherein providing an insurance policy offer to the account holder comprises providing an insurance policy with a coverage to sustain historic monetary levels in the financial account associated with the account holder.

13. A method according to claim 11, wherein the financial account is a loan, and said providing an insurance policy offer to the account holder from the insurance benefit database comprises providing a coverage to cover payments due on the financial account.

14. A method according to claim 11 wherein a coverage associated with the insurance policy offer is contingent upon the account holder not closing the financial account.

15. A method according to claim 11, wherein the account datacenter is accessed through the Internet.

16. A method according to claim 11, wherein the financial account is a loan, and said providing an insurance policy offer to the account holder from the insurance benefit database comprises providing a coverage to cover payments due on the financial account.

17. A method comprising:

providing an account data center;

providing an insurance benefit database associated with the account data center;

providing an eligibility database;

providing an account holder access to the account data center, where the account holder has an associated financial account;

accessing information in the eligibility database associated with at least one of (a) the account holder and/or (b) the information relating to the financial account;

determining a type and/or level of insurance to offer to the account holder; and providing an insurance policy offer to the account holder from the insurance benefit database, wherein the financial account is a credit card, and said providing an insurance policy offer to the account holder from the insurance benefit database comprises providing a coverage to cover payments due on the financial account.

18. A method according to claim 17 wherein a coverage associated with the insurance policy offer is contingent upon the account holder not closing the financial account.

19. A method according to claim 17, wherein a coverage associated with the insurance policy offer provides for the continuation of historic monetary levels.

20. A method according to claim 17 wherein the account datacenter is accessed through the Internet.

* * * * *